(12) United States Patent
Jiang (10) Patent No.: US 7,256,240 B1
(45) Date of Patent: Aug. 14, 2007

(54) PROCESS OF MAKING POLYMER BLENDS

(75) Inventor: Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/644,212

(22) Filed: Dec. 22, 2006

(51) Int. Cl.
*C08F 2/12* (2006.01)
*C08F 297/08* (2006.01)
*C08L 23/14* (2006.01)

(52) U.S. Cl. .................... 525/243; 525/53; 525/322; 525/324; 526/65

(58) Field of Classification Search ............... 525/53, 525/243, 322, 324; 526/65
See application file for complete search history.

(56) References Cited

U.S. PATENT DOCUMENTS

| | | | |
|---|---|---|---|
| 3,629,212 A | 12/1971 | Benedikter et al. | |
| 4,016,342 A | 4/1977 | Wagensommer | |
| 4,130,535 A | 12/1978 | Coran et al. | |
| 4,306,041 A | 12/1981 | Cozewith et al. | |
| 4,311,628 A | 1/1982 | Abdou-Sabet et al. | |
| 4,547,552 A * | 10/1985 | Toyota et al. ............... | 525/247 |
| 5,442,018 A * | 8/1995 | Cann et al. .................. | 526/65 |
| 6,207,756 B1 | 3/2001 | Datta et al. | |
| 6,245,856 B1 | 6/2001 | Kaufman et al. | |
| 6,319,998 B1 | 11/2001 | Cozewith et al. | |
| 6,388,016 B1 | 5/2002 | Abdou-Sabet et al. | |
| 6,492,473 B1 | 12/2002 | Canich et al. | |
| 6,646,044 B1 * | 11/2003 | Watanabe et al. ............. | 525/53 |
| 6,770,714 B2 | 8/2004 | Ommundsen et al. | |

\* cited by examiner

*Primary Examiner*—Fred Teskin
(74) *Attorney, Agent, or Firm*—Michael Kerns (57) ABSTRACT

In a process for producing a polymer blend, at least one first monomer is polymerized in a first slurry phase reaction zone in the presence of a supported first catalyst to produce a thermoplastic first polymer having a crystallinity of at least 30%. At least part of said first polymer is then contacted with at least one second monomer different from said first monomer in a second solution phase reaction zone in the presence of a second catalyst and in the absence of polyenes under conditions to produce a second polymer having a crystallinity of less than 20%.

22 Claims, 1 Drawing Sheet

Figure 1

PROCESS OF MAKING POLYMER BLENDS

FIELD OF THE INVENTION

This invention relates to a process of making a polymer blend.

BACKGROUND OF THE INVENTION

Polymer blends comprising a second polymer dispersed in a matrix of a first polymer are very useful and, depending on the properties and the relative amounts of the first and second polymers, a wide variety of such polymer blends can be produced. Of particular interest are polymer blends, also referred to as thermoplastic elastomers (TPE), in which the first polymer is a thermoplastic material, such as polypropylene, and the second polymer is an elastomeric material, such as an ethylene-propylene elastomer. Examples of such thermoplastic elastomers include polypropylene impact copolymers, thermoplastic olefins and thermoplastic vulcanizates.

Unlike conventional vulcanized rubbers, thermoplastic elastomers can be processed and recycled like thermoplastic materials, yet have properties and performance similar to that of vulcanized rubber at service temperatures. One method of making the aforementioned polymer blends is by melt mixing the two different polymers after they have been polymerized to achieve a target set of properties. However, this method is relatively expensive making it much more desirable to make blends by direct polymerization. Blending by direct polymerization typically uses multiple reactors in series, where the product from one reactor is fed to a second reactor having a different polymerizing environment, resulting in a final product that is an intimate mix of two different products. Examples of such processes employing vanadium catalysts in series reactor operation to produce different types of EPDM compositions are disclosed in U.S. Pat. Nos. 3,629,212, 4,016,342, and 4,306,041.

Currently, isotactic polypropylene is widely produced by a slurry polymerization process, whereas ethylene propylene copolymers having the desired properties for use in TPE applications are commercially produced in a solution process. However, existing solution processes are unable to produce polypropylene with high molecular weight and high melting point, both of which are important properties for TPE applications. Similarly, ethylene propylene copolymer elastomers have been difficult to produce using slurry-based polymerization systems since, even at low reactor temperatures, these tend to result in reactor fouling and the formation of rubbery clumps that attach themselves to the reactor agitator, necessitating frequent reactor shutdown. It is therefore difficult to produce a TPE material using either a slurry process (effective for the polypropylene component) or a solution process (effective for the rubber component).

Thus current in-reactor processes for producing propylene impact copolymers typically involve polymerizing propylene in a first reactor and transferring the polypropylene homopolymer from the first reactor into a secondary reactor where copolymerization of propylene and ethylene proceeds by virtue of still active catalyst on the polypropylene granules produced in the first reactor. No additional catalyst is fed into the secondary reactor, which is typically operated in a gas-phase process. However, only a limited amount of rubber phase can be produced in a gas phase process. Moreover, the rubbery phase material inherently has low melting or softening temperature. Under such conditions in either a fluidized or stirred gas-solid phase reactor, stickiness of the olefin polymer particles or granules becomes a problem. Ethylene copolymers using propylene, butene-1, and higher alpha comonomers are prone to stickiness problems when their crystallinity is below 30% or densities less than about 910 kg/m$^3$. The stickiness problem becomes even more critical with copolymers of ethylene and propylene having a crystalline content less than 10%. Only limited amount of the low crystallinity copolymer can be produced in the gas-phase reactor due to the sticky nature of low crystallinity copolymer. Presence of the low crystallinity copolymer also limits the polymerization temperature to a relatively low level. Low process temperatures are generally undesirable due to reduced conversion efficiency and consequent increased costs of operation.

In addition to the issue of reaction medium, choice of polymerization catalyst is another factor that currently limits in-reactor blending of TPE materials. Thus, although polypropylene and ethylene propylene elastomers are produced commercially by both metallocene catalyst systems and Ziegler-Natta catalysts, polypropylene produced using a Ziegler-Natta catalyst and an elastomer produced using a metallocene catalyst are preferred in many applications. However, there is a general perception in the industry that Ziegler-Natta catalysts and metallocene catalysts are incompatible and hence there is currently no in-reactor process for producing blends of Ziegler-Natta-produced polypropylene with metallocene-produced elastomer.

According to the present invention, a hybrid process for producing polymer blends has now been developed in which a first monomer, such as propylene, is polymerized in a first slurry phase reaction zone in the presence of a supported first catalyst, which can be either a Ziegler-Natta catalyst or a metallocene catalyst, under conditions to produce a thermoplastic first polymer. At least part of the first polymer is then contacted with at least one second monomer, such as ethylene, in a second solution phase reaction zone in the presence of a second catalyst, which again can be either a Ziegler-Natta catalyst or a metallocene catalyst, under conditions to produce said second polymer.

U.S. Pat. No. 6,245,856 discloses a thermoplastic olefin composition comprising polypropylene, an ethylene-alpha olefin elastomer and a compatabilizer comprising an ethylene-propylene copolymer having a propylene content of greater than 80 weight percent. According to this patent, the individual components of the composition can be separately manufactured and mechanically blended together in a mechanical mixer or two or more of the components can be prepared as a reactor blend using a series of reactors where each component is prepared in a separate reactor and the reactant is then transferred to another reactor where a second component is prepared.

U.S. Pat. No. 6,207,756 describes a process for producing a blend of a continuous phase of a semi-crystalline plastic, such as polypropylene, and a discontinuous phase of an amorphous elastomer, such as a terpolymer of ethylene, a $C_3$-$C_{20}$ alpha olefin and a non-conjugated diene. The blends are produced in series solution polymerization reactors. U.S. Pat. No. 6,319,998 also discloses using series solution polymerizations to produce blends of ethylene copolymers. U.S. Pat. No. 6,770,714 discloses the use of parallel polymerizations to produce different polymeric components that are then blended through extrusion or using other conventional mixing equipment. One polymeric component is a propylene homopolymer or copolymer and the second polymeric component is an ethylene copolymer.

U.S. Pat. No. 6,492,473 describes a mixed transition metal olefin polymerization catalyst system suitable for the polymerization of olefin monomers comprising at least one late transition metal catalyst system and at least one different catalyst system selected from the group consisting of late transition metal catalyst systems, transition metal metallocene catalyst systems or Ziegler-Natta catalyst systems. Preferred embodiments include at least one late transition metal catalyst system comprising a Group 9, 10, or 11 metal complex stabilized by a bidentate ligand structure and at least one transition metal metallocene catalyst system comprising a Group 4 metal complex stabilized by at least one ancillary cyclopentadienyl ligand. The polymerization process for olefin monomers comprises contacting one or more olefins with these catalyst systems under polymerization conditions.

SUMMARY OF THE INVENTION

In one aspect, the present invention resides in a process for producing a polymer blend comprising a thermoplastic first polymer having a crystallinity of at least 30% and a second polymer having a crystallinity of less than 20%, the process comprising:

(a) polymerizing at least one first monomer in a first slurry phase reaction zone in the presence of a supported first catalyst under conditions to produce said thermoplastic first polymer; and (b) contacting at least part of said first polymer with at least one second monomer different from said first monomer in a second solution phase reaction zone in the presence of a second catalyst and in the absence of polyenes under conditions to produce said second polymer.

Conveniently, said polymer blend comprises a heterogeneous blend in which said first polymer comprises a continuous phase of the blend and said second polymer is in the form of particles dispersed in said continuous phase.

Alternatively, said polymer blend comprises a homogeneous blend.

In a further aspect, the present invention resides in a process for producing a polymer blend comprising a first phase comprising a thermoplastic first polymer comprising units derived from propylene and a second elastomeric phase comprising a second polymer comprising units derived from ethylene and propylene, the process comprising:

(a) polymerizing at least one first monomer comprising propylene in a first slurry phase reaction zone in the presence of a supported first catalyst under conditions to produce said thermoplastic first polymer; and (b) contacting at least part of said first polymer with at least one second monomer comprising ethylene in a second solution phase reaction zone in the presence of a second catalyst and in the absence of polyenes under conditions to produce said second polymer.

Conveniently, said supported first catalyst comprises a metallocene catalyst. Alternatively, said supported first catalyst comprises a Ziegler-Natta catalyst.

Conveniently, said second catalyst comprises a metallocene catalyst.

In yet a further aspect, the present invention resides in a process for producing a polymer blend comprising a first phase comprising a thermoplastic first polymer comprising units derived from propylene and a second elastomeric phase comprising a second polymer comprising units derived from ethylene and propylene, the process comprising:

(a) polymerizing at least one first monomer comprising propylene in a first slurry phase reaction zone in the presence of a supported Ziegler-Natta catalyst under conditions to produce said thermoplastic first polymer; and (b) contacting at least part of said first polymer with at least one second monomer comprising ethylene in a second solution phase reaction zone in the presence of a metallocene catalyst under conditions to produce said second polymer.

Conveniently, said thermoplastic first polymer is a homopolymer of propylene or a copolymer of propylene with less than 15 wt % of at least one comonomer, wherein said at least one comonomer comprises ethylene or a $C_4$ to $C_{20}$ olefin.

Conveniently, said second polymer is a copolymer of propylene with from about 8 wt % to about 70 wt % of said at least one second monomer comprising ethylene.

DETAILED DESCRIPTION OF THE EMBODIMENTS

As used herein, the numbering scheme for the Periodic Table Groups is the new notation as set out in CHEMICAL AND ENGINEERING NEWS, 63(5), 27 (1985).

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more monomers. Thus, as used herein, the term "polypropylene" means a polymer made of at least 50 weight % propylene units, preferably at least 70% propylene units, more preferably at least 80% propylene units, even more preferably at least 90% propylene units, even more preferably at least 95% propylene units or 100% propylene units.

As used herein, the term "heterogeneous blend" means a composition having two or more morphological phases in the same state. For example a blend of two polymers where one polymer forms discrete packets dispersed in a matrix of another polymer is said to be heterogeneous in the solid state. Also a heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM). In the event the SEM and AFM provide different data, then the AFM data are used. By continuous phase is meant the matrix phase in a heterogeneous blend. By discontinuous phase is meant the dispersed phase in a heterogeneous blend.

In contrast, a "homogeneous blend" is a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on a dynamic mechanical thermal analyzer (DMTA) trace of tan δ (i.e., the ratio of the loss modulus to the storage modulus) versus temperature. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous. The polymer blend produced herein is generally a heterogeneous blend.

As used herein the term "slurry polymerization process" means a polymerization process where a supported catalyst is employed and monomers are polymerized on the supported catalyst particles. At least 95 wt % of polymer products derived from the supported catalyst is in granular form as solid particles (not dissolved in the diluent). A slurry process is preferred for polymers with high crystallinity. A "solution polymerization process" means a polymerization process where a homogeneous catalyst (unsupported) is used, and at least 95 wt. % of the product derived from the homogeneous catalyst is dissolved in the solvent or reaction medium. The first thermoplastic polymer may be present in the second polymerization zone in the solution process in the form of granules, as a swelled suspension or be dissolved in the reaction medium. The physical state of the first polymer in the second reaction zone depends on the reaction environment such solvent, temperature and pressure. Preferably, the polymerization condition in the second polymerization zone is chosen to allow the first polymer to be dissolved into the reaction medium.

The present invention provides a process for producing a polymer blend, such as a blend of ethylene propylene rubber and isotactic polypropylene, in which at least one first monomer, typically propylene, is polymerized in a first slurry phase reaction zone in the presence of a supported first catalyst under conditions to produce a thermoplastic first polymer having a crystallinity of at least 30%. At least part of the first polymer is then contacted with at least one second monomer, typically ethylene, in a second solution phase reaction zone in the presence of a second catalyst and in the absence of polyenes under conditions to produce a second elastomeric polymer having a crystallinity of less than 20%.

Thus the present process allows the optimal polymerization medium for producing polypropylene, namely a slurry polymerization medium, to be combined with the optimal polymerization medium for producing an ethylene propylene rubber, namely a solution polymerization medium. Moreover, it is found that each of the first and second catalysts can be either a Ziegler-Natta catalyst or a metallocene catalyst. Thus, for example, it is possible to employ a Ziegler-Natta catalyst to produce the polypropylene, thereby maximizing the melting temperature and molecular weight distribution of the polypropylene, while a metallocene catalyst is employed to produce the ethylene propylene rubber, thereby improving product physical properties due to better homogeneity and random comonomer incorporation. Metallocene catalyst can also incorporate comonomer readily without significant loss of catalyst activity or molecular weight. The utilization of a conventional Ziegler-Natta or vanadium based catalyst compositions in such polymerizations leads to product that is lacking in a desired level of homogeneity and randomness as to comonomer incorporation.

The resultant product is generally a heterogeneous polymer blend, in which the thermoplastic first polymer normally constitutes the continuous phase and the second polymer is in the form of fine particles dispersed in the continuous phase. The resultant heterogeneous polymer blend contains hybrid polymers. While not wishing to bound by theory, it is believed that reactive intermediates (macro molecules with terminal unsaturation) generated in the first reactor engage in the polymerization processes taking place in the second reactor, producing hybrid polymers (also known as branch-block copolymers) that combine the characteristics of the polymers formed in the first and second reactor zones, such as the melting temperature of the first polymer and the lower glass transition temperatures of the second polymer.

Following the two polymerization steps, the product composition, direct from the polymerization reactor, can undergo a typical polymer finishing operation, where suitable additives are incorporated and the polymer is melt homogenized. The finished product displays easy processability, high elastic recovery, high tensile strength and elongation.

The First Polymer

The first polymer of the present polymer blend may be any crystalline or semi-crystalline thermoplastic polymer or a mixture thereof. Useful thermoplastic polymers have a crystallinity of at least 30%, more preferably at least 40% as determined by differential scanning calorimetry (DSC). The first polymer provides the composition with required tensile strength and temperature resistance. Accordingly, semi-crystalline polymers with a melting temperature, as measured by DSC, above 100° C., such as above 120° C., for example above 140° C., typically above 150° C., even above 160° C. are desired. Typically, the first polymer has a crystallization temperature (Tc) between about 20 and about 120° C., such as between about 70 and about 110° C. Polymers with a high glass transition temperature to provide the elevated temperature resistance are also acceptable as the thermoplastic matrix.

Exemplary thermoplastic polymers are crystalline polyolefins that are formed by polymerizing $C_2$ to $C_{20}$ olefins such as, but not limited to, ethylene, propylene and $C_4$ to $C_{12}$ α-olefins, such as 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin, such as butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1 and dodecene-1, may also be used.

In one embodiment, the thermoplastic polymer comprises a propylene homopolymer, a copolymer of propylene, or a mixture of propylene homopolymers and copolymers. Typically, the propylene polymer is predominately crystalline, i.e., it has a melting point generally greater than 110° C., alternatively greater than 115° C., and preferably greater than 130° C. The term "crystalline," as used herein, characterizes those polymers that possess high degrees of inter- and intra-molecular order in the solid state. Heat of fusion, a measure of crystallinity, greater than 60 J/g, alternatively at least 70 J/g, alternatively at least 80 J/g, as determined by DSC analysis, is preferred. The heat of fusion is dependent on the composition of the polypropylene. A propylene homopolymer will have a higher heat of fusion than a copolymer or blend of a homopolymer and copolymer.

Where the thermoplastic first polymer is polypropylene, the polymer can vary widely in composition. For example, substantially isotactic polypropylene homopolymer or propylene copolymer containing 10 weight percent or less of a comonomer can be used (i.e., at least 90% by weight propylene). Further, polypropylene segments may be part of graft or block copolymers having a sharp melting point above 110° C. and alternatively above 115° C. and alternatively above 130° C., characteristic of the stereoregular propylene sequences. When the first polymer is a propylene copolymer, the percentage of the copolymerized alpha-olefin in the copolymer is, in general, up to 9% by weight, alternatively 0.5% to 8% by weight, alternatively 2% to 6% by weight. The preferred alpha-olefins contain 2 or from 4 to 12 carbon atoms. One, two or more alpha-olefins can be copolymerized with the propylene.

The Second Polymer

The second polymer phase of the present polymer blend is an elastomeric copolymer and is polymerized in the presence of the first polymer. The second polymer is generally an amorphous or low crystallinity (having a crystallinity of less than 20%) polymer. Some non-limiting examples of suitable elastomers include olefin copolymers, butyl rubber, styrene-butadiene copolymer rubber, butadiene rubber, halogenated rubber such as brominated and chlorinated isobutylene-isoprene copolymer rubber, butadiene-styrene-vinyl pyridine rubber, urethane rubber, polyisoprene rubber, epichlorohydrin terpolymer rubber, and polychloroprene. The second polymer can also comprise atactic polymers, such as atactic polypropylene. The preferred second polymers are elastomeric olefin copolymers.

Suitable elastomeric copolymers for use in the present blend are rubbery copolymers produced by copolymerizing two or more alpha olefins. More typically, the elastomeric component is a copolymer of ethylene with at least one $C_3$ to $C_{20}$ alpha-olefin, such as propylene, butene-1, hexene-1, 4-methyl-1 pentene, octene-1, decene-1, or combinations thereof. The preferred alpha-olefins are propylene, hexene-1, octene-1 or combinations thereof. Thus, for example, the second polymer can be an ethylene-propylene copolymer, such as an ethylene-propylene copolymer comprising from about 8 wt % to about 70 wt % of ethylene.

In one embodiment, during the second polymerization step to produce the elastomeric phase, it is believed that a distribution of cross-products are formed emanating principally from the grafting of the first thermoplastic polymer to the second elastomeric polymer. These hybrid cross-products, also known as branch-block copolymers, form when reactive intermediates from the first polymerization step cross-over into the second polymerization step and participate in the polymerization of the second polymer. The presence of branch-block copolymers is believed to influence the events occurring during the polymerization as well as product properties. The extent of influence depends on the population distribution of the branch-block copolymer fraction.

In another embodiment, the catalyst employed in the first polymerization stage for production of the crystalline polymer is also capable of producing the second elastomeric copolymer in the second reaction zone. The elastomeric copolymer derived from the first supported catalyst in the second reaction zone could have different molecular weight and chemical composition from the product derived from the second catalyst. An elastomeric copolymer with bimodal distributions in molecular weight and composition could then be formed. The nature of bimodal distribution would depend on the catalyst and reaction environment in the second solution zone. The utilization of a conventional Ziegler-Natta or vanadium based catalyst composition in such polymerizations also leads to product that is a blocky (lacking in a desired level of homogeneity and randomness) as to comonomer incorporation, whereas a more homogenous or more random comonomer incorporation is generally produced when a metallocene catalyst is used.

The amount of second polymer relative to the first polymer may vary widely depending on the nature of the polymers and the intended use of the final polymer blend. In particular, however, one advantage of the process of the invention is the ability to be able to produce a heterogeneous polymer blend in which the second polymer comprises more than 50 wt %, such as more than 60 wt %, for example more than 70 wt % of the total heterogeneous polymer blend. For thermoplastic olefin (TPO) or impact copolymer applications, the weight ratio of the second polymer to the first polymer is generally from about 49:51 to about 10:90, more preferably from 35:65 to about 15:85. TPOs are multiphase polymer blends where the polypropylene forms a continuous matrix phase and the modifier component, generally derived from an ethylene containing interpolymer, is the dispersed phase. The polypropylene matrix imparts tensile strength and chemical resistance to the TPO, while the ethylene polymer imparts flexibility and impact resistance. For soft, flexible polypropylene applications, higher rubber content, such as above 80 wt %, is desired.

In one preferred embodiment, the thermoplastic first polymer normally constitutes the continuous phase of the heterogeneous polymer blend and the second polymer is in the form of fine particles dispersed in the continuous phase. Typically, the particles of the second polymer have an average size of less than 20 micron, normally less than 10 micron, preferably less than 5 microns, more preferably less than 3 microns, for example from 50 nanometers and about 3 microns.

Production of the Polymer Blend

The present polymer blend is produced by a novel two-step process. In the first step, a crystalline thermoplastic polymer, typically containing propylene derived units, is produced by polymerizing at least one first monomer in one or more polymerization zones in the presence of a supported first catalyst in a slurry process. The effluent from the first step is then fed to a second polymerization step where at least one second monomer different from the first monomer, and typically ethylene, is polymerized in a solution process in the presence of the polymer produced in the first step but in the absence of polyenes to produce an elastomeric component typically in the form of finely dispersed particles embedded within the crystalline thermoplastic matrix.

Conveniently, the first slurry polymerization step is conducted in a continuous, stirred tank or a loop reactor. Tubular reactors equipped with the hardware to introduce feeds and catalysts in staged manner can also be used. Generally, polymerization reactors are agitated (stirred) to reduce or avoid concentration gradients. Reaction environments include the case where the monomer(s) acts as a diluent as well as the case where a liquid hydrocarbon is used as a diluent. Preferred hydrocarbon liquids include both aliphatic and aromatic fluids such as desulphurized light virgin naphtha and alkanes, such as propane, isobutane, mixed butanes, hexane, pentane, isopentane, cyclohexane, isooctane, and octane. In an alternate embodiment a perfluorocarbon or hydrofluorocarbon is used as the diluent.

Suitable conditions for the first polymerization step include a temperature from about 50 to about 250° C., preferably from about 50 to about 150° C., more preferably from about 70 to about 150° C. and a pressure of 0.1 MPa or more, preferably 2 MPa or more. The upper pressure limit is not critically constrained but is typically 200 MPa or less, preferably, 120 MPa or less, except when operating in supercritical phase then the pressure and temperature are above the critical point of the reaction media in question (typically over 95° C. and 4.6 MPa for propylene polymerizations). For more information on running supercritical polymerizations, see International Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

In the second polymerization step, some or all of the first polymer formed in the first polymerization step and at least one second monomer, typically ethylene, are dissolved in a solvent and are contacted in solution with a suitable catalyst under conditions sufficient to polymerize the second monomer(s) to produce the second polymer. Suitable solvents include both aliphatic and aromatic hydrocarbon fluids. Examples of suitable, preferably inert, hydrocarbon fluids are readily volatile liquid hydrocarbons, which include, for example, saturated hydrocarbons containing from 1 to 50, preferably 3 to 20, carbon atoms. Preferred examples include propane, n-butane, isobutane, n-pentane, isopentane, neopentane, n-hexane, cyclohexane, isohexane, octane, and other saturated C6 to C8 hydrocarbons. Preferred hydrocarbon fluids also include alkanes (preferably C1 to C8 alkanes), such as propane, isobutane, mixed butanes, hexane, pentane, isopentane, desulphurized light virgin naphtha, cyclohexane and octane, are preferred. In one embodiment, the diluent further comprises at least one C1 to C40 alkane, alternatively C2 to C8 alkane. Typical conditions in the second polymerization zone include a temperature of about 10° C. to about 250° C. and a pressure of about 0.1 MPa to about 200 MPa.

The current process can be also carried out in a multiple-zone reactor, or separate, series-connected reactors, with the entire effluent from the first polymerization zone, including any active catalyst, being transferred to the second polymerization zone. Additional catalyst can then be added, as necessary to the second polymerization zone. In a particularly preferred embodiment, the process of the invention is conducted in two or more series-connected, continuous flow, stirred tank reactors using a supported Ziegler-Natta catalyst in the first polymerization zone and a homogeneous metallocene catalyst in the second polymerization zone.

In another embodiment, catalyst quenching is applied between the two polymerization zones and a separate catalyst is introduced in the second reaction zone to produce the elastomer component. Catalyst quenching agents (such as air or an alcohol) may be introduced into the effluent from the first polymerization zone right after the reactor exit to deactivate the catalyst used for the first polymerization. Scavenger may be useful and can be fed into the effluent downstream of the catalyst quenching agent injection point or the second polymerization zone.

By selecting the catalysts and the polymerization reaction conditions, some molecules of the first polymer(s) and the second polymer(s) can be linked together to produce branch-block structures. While not wishing to be bound by theory, the branch-block copolymer is believed to comprise an amorphous backbone having crystalline side chains originating from the first polymer.

To effectively incorporate the polymer chains of the first polymer into the growing chains of the second polymer, it is preferable that the first polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer having reactive termini into a growing polymer chain. Vinyl terminated chains are generally more reactive than vinylene or vinylidene terminated chains. Generally, it is desirable that the first polymerization step produces a first polymer having at least 0.01% terminal unsaturation.

A polymer can be recovered from the effluent of either the first polymerization step or the second polymerization step by separating the polymer from other constituents of the effluent using conventional separation means. For example, polymer can be recovered from either effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis (4-methyl-6-tert-butyl) phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Any known polymerization catalyst, for example a Ziegler-Natta catalyst system or a single-site, metallocene catalyst system, or a combination thereof including a bimetallic (i.e, Z/N and/or metallocene) catalyst, can be used in each of the first and second polymerization steps. In one embodiment, however, the catalyst employed in the first slurry polymerization step is a Ziegler-Natta catalyst and the catalyst employed in the second solution polymerization step is a single-site, metallocene catalyst. Preferred Ziegler-Natta catalysts are those capable of polymerizing a $C_2$ to $C_{20}$ olefin to produce a first polymer having at least 30% crystallinity and a peak melting temperature of 160° C. or higher.

In another embodiment, a supported metallocene catalyst is employed in the first polymerization zone, while a homogeneous metallocene is used in the second polymerization step.

Ziegler-Natta Catalysts

In one embodiment, a Ziegler-Natta type catalyst, together with donors and optional scavengers, is used in the first slurry polymerization step of the present process.

Ziegler-Natta type catalysts are catalyst compositions that incorporate Ziegler-Natta transition metal components.

Typically, the transition metal component is a compound of a Group 4, 5, or 6 metal. The transition metal component is generally represented by any one of the formulas: $TrX_{4-q}(OR^1)_q$, $TrX_{4-q}R^2_q$, $VOX_3$, and $VO(OR^1)_3$, wherein Tr is a Group 4, 5, or 6 metal, preferably a Group 5 or 6 metal, and more preferably titanium, vanadium or zirconium, q is 0 or a number equal to or less than 4, X is a halogen and $R^1$ is an alkyl group, aryl group or cycloalkyl group having from 1 to 20 carbon atoms, and $R^2$ is an alkyl group, aryl group, aralkyl group, substituted aralkyl group, and the like. The aryl, aralkyls, and substituted aralkyls contain from 1 to 20 carbon atoms, preferably 1 to 10 carbon atoms. In a preferred embodiment of the formula $TrX_{4-q}R^2_q$, the hydrocarbyl group, $R^2$, does not contain an H atom in the beta position. Illustrative, but non-limiting examples of alkyl groups are methyl, neo-pentyl, 2,2-dimethylbutyl, 2,2-dimethylhexyl; aryl groups such as phenyl, naphthyl; aralkyl groups such as benzyl; cycloalkyl groups such as 1-norbornyl. Mixtures of these transition metal compounds can be employed if desired.

Illustrative examples of titanium compounds include: $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_{12}H_{25})Cl_3$, $Ti(OC_2H_5)_2Br_2$, $Ti(OC_8H_{17})_2Br_2$ and $TiCl_3 \cdot 1/3 AlCl_3$. Illustrative examples of vanadium compounds include: $VCl_4$, $VOCl_3$, $VO(OC_2H_5)_3$, and $VO(OC_4H_9)_3$. Illustrative examples of zirconium compounds include: $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

Mixtures of the transition metal compounds may be usefully employed, no restriction being imposed on the number of transition metal compounds that may be incorporated. Any halogenide and alkoxide transition metal compound or mixtures thereof can be usefully employed.

Typically the Ziegler-Natta catalyst system includes a cocatalyst composition, generally comprising an organic compound of a metal of Group 1, 2, 12, or 13 of the Periodic Table. Examples of organic metal compounds employed as cocatalysts include organic compounds of lithium, magnesium, calcium, zinc, and aluminum. Organic aluminum compounds are preferred. Particularly preferred organic aluminum compounds are those represented by the general formula $R_nAlX_{3-n}$ (wherein R denotes an alkyl group or an aryl group having from 1-18 carbon atoms, X denotes a halogen atom, an alkoxy group or a hydrogen atom, and n denotes a desired number in the range of 1 to 3). Examples of organic aluminum compounds include alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride, respectively having 1 to 18 carbon atoms, preferably 2 to 6 carbon atoms, and mixtures and complex compounds thereof. Illustrative examples of such organic aluminum compounds include trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride.

In one embodiment, trialkyl aluminum compounds, specifically trimethyl aluminum, triethyl aluminum, and triisobutyl aluminum, are preferred. In another embodiment, trialkyl aluminum compounds are used in combination with other organic aluminum compounds such as diethyl aluminum chloride, ethyl aluminum dichloride, ethyl aluminum sesquichloride, diethyl aluminum ethoxide, or diethyl aluminum hydride. The organic aluminum compounds may be used in the form of a mixture or complex compound.

In another embodiment, the cocatalyst is an organic aluminum compound having two or more aluminum atoms linked through an oxygen atom or nitrogen atom. Examples of such organic aluminum compounds include $(C_2H_5)_2AlOAl(C_2H_5)_2$, $(C_4H_9)_2AlOAl(C_4H_9)_2$, and Examples of organic compounds of metals other than aluminum are diethyl magnesium, ethyl magnesium chloride, diethyl zinc, and such compounds as $LiAl(C_2H_5)_4$ and $LiAl(C_7H_{15})_4$. The ratio of organometallic compound to transition metal component will generally be in the range of from about 1 to about 100 moles of aluminum per mole of transition metal component metal on the support.

In another embodiment, the catalyst composition includes one or more alkali earth or alkali metal halide compounds. Preferably, the catalyst composition includes a titanium transition metal and one or more alkali earth or alkali metal halide compounds. Such catalyst compositions include at least one alkali earth or alkali metal halide compound in an amount to dilute titanium centers (and hence increase the active centers), stabilize active titanium centers from the deactivation process, and/or enhance the chain transfer process during polymerization. Magnesium halide is a preferred alkali earth halide. Examples of magnesium halide compounds include $MgCl_2$ and $MgBr_2$. $MgCl_2$, particularly anhydrous $MgCl_2$ is preferred. In one embodiment, from about 1 to 10 moles of magnesium chloride per mole of the titanium compound are used. Other suitable alkali earth compounds include those represented by the formula $Mg(OR)_2$, wherein R is an alkyl group, preferably a $C_1$-$C_8$ alkyl group, as well as the compound $Mg(OH)Cl$.

The Ziegler-Natta catalyst system may also contain at least one non-transition metal electron donor. Illustrative but non-limiting examples of electron donor compounds, known as "Lewis Bases," include aliphatic and aromatic esters, aliphatic ethers, cyclic ethers, and aliphatic ketones. Examples of preferred compounds include tetrahydrofuran, dioxane, acetone, methyl formate and diethyl ether. A particularly preferred electron donor compound is tetrahydrofuran. The molar ratio of the electron donor compound to transition metal compound, particularly titanium containing compound, ranges from about 2 to 30 moles, and more preferably from about 5 to 15 moles of electron donor compound per mole of the transition metal compound.

Metallocene Catalysts

Where a metallocene catalyst system is employed in the first slurry polymerization step, the metallocene component of the system is conveniently a bridged, substituted bis (cyclopentadienyl) metallocene, specifically a bridged, substituted bis(indenyl) metallocene known to produce high molecular weight, high melting, highly isotactic propylene polymers. Particularly suitable catalysts are bridged bis-indenyl metallocene catalysts having a substituent on one or both of the 2- and 4-positions on each indenyl ring or those having a substituent on the 2-, 4-, and 7-positions on each indenyl ring. Generally speaking, those of the generic class disclosed in U.S. Pat. No. 5,770,753 (fully incorporated herein by reference) should be suitable, however, it has been found that the exact polymer obtained is dependent on the metallocene's specific substitution pattern, among other things. A specific list of useful catalyst compounds is found in International Patent Publication No. WO 2004/026921 at page 29 paragraph [00100] to page 66, line 4. In another embodiment, the catalyst compounds described in International Patent Publication No. WO 2004/026921 at page 66, paragraph [00103] to page 70, line 3 may also be used in the practice of this invention.

Particularly preferred are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl,4-phenylindenyl)zirconium dichloride, rac dimethylsiladlyl bis-(2-methyl, 4-napthylindenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl] indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl] indenyl)$_2$ zirconium dichloride. Alkylated variants of these metallocenes (e.g. di-methyl instead of dichloride) are also useful, particularly when combined with a non-coordinating anion type activator. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

Where metallocene catalyst system is used to produce the elastomeric second polymer, this is conveniently one of, or a mixture of, metallocene compounds of either or both of the following types:

1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes are represented by the formula $$(Cp^1R^1{}_m)R^3{}_n(Cp^2R^2{}_p)MX_q$$

wherein Cp$^1$ of ligand (Cp$^1$ R$^1{}_m$) and Cp$^2$ of ligand (Cp$^2$ R$^2$p) are the same or different cyclopentadienyl rings, R$^1$ and R$^2$ each is, independently, a halogen or a hydrocarbyl, halocarbyl, hydrocarbyl-substituted organometalloid or halocarbyl-substituted organometalloid group containing up to about 20 carbon atoms, m is 0, 1, 2, 3, 4, or 5, p is 0, 1, 2, 3, 4 or 5, and two R$^1$ and/or R$^2$ substituents on adjacent carbon atoms of the cyclopentadienyl ring associated there with can be joined together to form a ring containing from 4 to about 20 carbon atoms, R$^3$ is a bridging group, n is the number of atoms in the direct chain between the two ligands and is 0, 1, 2, 3, 4, 5, 6, 7, or 8, preferably 0, 1, 2, or 3, M is a transition metal having a valence of 3, 4, 5 or 6, preferably from Group 4, 5, or 6 of the Periodic Table of the Elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or 16 of the periodic table of the elements. These mono-cyclopentadienyl complexes are represented by the formula $$Cp^1R^1{}_m)R^3{}_n(Y\ R^2)MX_s$$

wherein R$^1$ is, each independently, a halogen or a hydrocarbyl, halocarbyl, hydrocarbyl-substituted organometalloid or halocarbyl-substituted organometalloid group containing up to about 20 carbon atoms, m is 0, 1, 2, 3, 4 or 5, and two R$^1$ substituents on adjacent carbon atoms of the cyclopentadienyl ring associated therewith can be joined together to form a ring containing from 4 to about 20 carbon atoms, R$^3$ is a bridging group, n is 0, or 1, M is a transition metal having a valence of from 3, 4, 5, or 6, preferably from Group 4, 5, or 6 of the Periodic Table of the Elements and is preferably in its highest oxidation state, Y is a heteroatom containing group in which the heteroatom is an element with a coordination number of three from Group 15 or a coordination number of two from Group 16 preferably nitrogen, phosphorous, oxygen, or sulfur, R$^2$ is a radical independently selected from a group consisting of C$_1$ to C$_{20}$ hydrocarbon radicals, substituted C$_1$ to C$_{20}$ hydrocarbon radicals, wherein one or more hydrogen atoms is replaced with a halogen atom, and when Y is three coordinate and unbridged there may be two R$_2$ groups on Y each independently a radical selected from a group consisting of C$_1$ to C$_{20}$ hydrocarbon radicals, substituted C$_1$ to C$_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, s is equal to the valence of M minus 2; Cp¹ is a Cp ring.

Examples of suitable biscyclopentadienyl metallocenes of the type described in Group 1 above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting examples of preferred biscyclopentadienyl metallocenes of the type described in Group 1 above for the invention are the racemic isomers of:

μ-(CH$_3$)$_2$ Si(indenyl)$_2$ M(Cl)$_2$
μ-(CH$_3$)$_2$ Si(indenyl)$_2$ M(CH$_3$)$_2$
μ-(CH$_3$)$_2$ Si(tetrahydroindenyl)$_2$ M(Cl)$_2$
μ-(CH$_3$)$_2$ Si(tetrahydroindenyl)$_2$ M(CH$_3$)$_2$
μ-(CH$_3$)$_2$ Si(indenyl)$_2$ M(CH$_2$CH$_3$)$_2$
μ-(C$_6$H$_5$)$_2$ C(indenyl)$_2$ M(CH$_3$)$_2$ wherein M is chosen from a group consisting of Zr and Hf.

Examples of suitable unsymmetrical cyclopentadienyl metallocenes of the type described in Group 1 above for the invention are disclosed in U.S. Pat. Nos. 4,892,851; 5,334,677; 5,416,228; and 5,449,651; and are described in publication J. Am. Chem. Soc. 1988, 110, 6255, all of which are incorporated by reference herein.

Illustrative, but not limiting examples of preferred unsymmetrical cyclopentadienyl metallocenes of the type described in Group 1 above for the invention are:

μ-(C$_6$H$_5$)$_2$ C(cyclopentadienyl)(fluorenyl)M(R)$_2$
μ-(C$_6$H$_5$)$_2$ C(3-methylcyclopentadienyl)(fluorenyl)M(R)$_2$
μ-(CH$_3$)$_2$ C(cyclopentadienyl)(fluorenyl)M(R)$_2$
μ-(C$_6$H$_5$)$_2$ C(cyclopentadienyl)(2-methylindenyl)M(R)$_2$
μ-(C$_6$H$_5$)$_2$ C(3-methylcyclopentadienyl)(2-methylindenyl)M(R)$_2$
μ-(p-triethylsilylphenyl)$_2$ C(cyclopentadienyl)(3,8-di-t-butylfluorenyl) M(R)$_2$
μ-(C$_6$H$_5$)$_2$ C(cyclopentadienyl)(2,7-dimethylindenyl)M(R)$_2$
μ-(CH$_3$)$_2$ C(cyclopentadienyl)(2,7-dimethylindenyl)M(R)$_2$.

wherein M is chosen from the group consisting of Zr and Hf and R is chosen from the group consisting of C$_1$ and CH$_3$.

Examples of suitable monocyclopentadienyl metallocenes of the type described in group 2 above for the invention are disclosed in U.S. Pat. Nos. 5,026,798; 5,057,475; 5,350,723; 5,264,405; 5,055,438 and are described in publication WO 96/002244, all of which are incorporated by reference herein.

Illustrative, but not limiting examples of preferred monocyclopentadienyl metallocenes of the type described in group 2 above for the invention are:

μ-(CH$_3$)$_2$ Si(cyclopentadienyl)(1-adamantylamido)M(R)$_2$
μ-(CH$_3$)$_2$ Si(3-tertbutylcyclopentadienyl)(1-adamantylamido)M(R)$_2$
μ-(CH$_3$)$_2$ Si(tetramethylcyclopentadienyl)(1-adamantylamido)M(R)$_2$
μ-(CH$_3$)$_2$ C(tetramethylcyclopentadienyl)(1-adamantylamido)M(R)$_2$
μ-(CH$_3$)$_2$ Si(tetramethylcyclopentadienyl)(1-tertbutylamido)M(R)$_2$
μ-(CH$_3$)$_2$ Si(fluorenyl)(1-tertbutylamido)M(R)$_2$
μ-(CH$_3$)$_2$ Si(tetramethylcyclopentadienyl)(1-cyclododecylamido)M(R)$_2$
μ-(CH$_3$)$_2$ C(tetramethylcyclopentadienyl)(1-cyclododecylamido)M(R)$_2$ wherein M is selected from a group consisting of Ti, Zr, and Hf and wherein R is selected from C$_1$ and CH$_3$.

The manner of activation of the metallocene catalyst used in the first or second polymerization step can vary. Alumoxane and preferably methyl alumoxane (MAO) can be used. Non-or weakly coordinating anion activators (NCA) may be obtained in any of the ways described in EP277004, EP426637. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

The alumoxane activator may be utilized in an amount to provide a molar aluminum to metallocene ratio of from 1:1 to 20,000:1 or more. The non-coordinating compatible anion activator may be utilized in an amount to provide a molar ratio of metallocene compound to non-coordinating anion of 10:1 to 1:1.

Particularly useful activators include dimethylanilinium tetrakis (pentafluorophenyl) borate and dimethyl anilinium tetrakis(heptafluoro-2-naphthyl) borate. For a more detailed description of useful activators see International Patent Publication No. WO 2004/026921 at page 72, paragraph [00119] to page 81 paragraph [00151]. A list of particularly useful activators that can be used in the practice of this invention may be found at page 72, paragraph [00177] to page 74, paragraph [00178] of International Patent Publication No. WO 2004/046214.

Catalyst Supports

The catalyst system used to produce the first thermoplastic polymer comprises a support material. The support material can be any solid, particularly porous support material such as talc or inorganic oxides, or resinous support materials such as a polyolefin. Preferably, the support material is an inorganic oxide.

Examples of suitable inorganic oxide materials include Group 2, 4, 13, 14 metal oxides such as silica, alumina, silica-alumina and mixtures thereof. Other inorganic oxides that may be employed either alone or in combination with the silica, alumina or silica-alumina are magnesia, titania, zirconia, and the like. Other suitable support materials, however, can be employed, for example, polyolefins such as polyethylene.

Preferably the support material is porous silica which has a surface area in the range of from 10 to 700 m²/g, a total pore volume in the range of from 0.1 to 4.0 cc/g and an average particle size in the range of from 10 to 500 μm. More preferably, the surface area is in the range of from 50 to 500 m²/g, the pore volume is in the range of from 0.5 to 3.5 cc/g and the average particle size is in the range of from 20 to 200 μm. Most desirably the surface area is in the range of from 100 to 400 m²/g, the pore volume is in the range of from 0.8 to 3.0 cc/g and the average particle size is in the range of from 30 to 100 μm. The average pore size of typical porous support materials is in the range of from 10 to 1000 Angstrom. Preferably, a support material is used that has an average pore diameter of from 50 to 500 Angstrom, and most desirably from 75 to 350 Angstrom.

In another embodiment, the inorganic oxide support is any particulate oxide or mixed oxide that has been thermally or chemically dehydrated such that it is substantially free of moisture. Thermal treatment is preferably carried out in vacuum or while purging with a dry inert gas such as nitrogen at a temperature of about 100° C. to about 1000° C., and preferably from about 300° C. to about 800° C. Pressure considerations are not critical. The duration of the thermal treatment can be from about 1 to about 24 hours; however, shorter or longer times can be employed provided equilibrium is established with the surface hydroxyl groups.

Chemical dehydration as an alternative method of dehydration of the metal oxide support material can advantageously be employed. Chemical dehydration converts water and hydroxyl groups on the oxide surface to inert species. Useful chemical agents include, for example, $SiCl_4$, and chlorosilanes, such as trimethylchlorosilane, dimethyaminotrimethylsilane and the like. Chemical dehydration is accomplished by slurrying the inorganic particulate material, for example, silica in an inert low boiling hydrocarbon, such as, hexane. During the chemical dehydration reaction, the silica should be maintained in a moisture and oxygen-free atmosphere. To the silica slurry is then added a low boiling inert hydrocarbon solution of the chemical dehydrating agent, such as, dichlorodimethylsilane. Preferably, the temperature ranges during chemical dehydration reaction are from about 25° C. to about 120° C.; however, higher and lower temperatures can be employed. Preferably, the temperature will be about 50° C. to about 70° C.

The chemical dehydration procedure should be allowed to proceed until sufficient moisture is removed from the particulate support material as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

Particularly where the supported catalyst comprises a Ziegler-Natta catalyst, the support material may be surface modified. Surface modification is preferably accomplished by treating the support material such as silica, alumina or silica-alumina with an organometallic compound having hydrolytic character. More particularly, the surface modifying agents for the support materials comprise the organometallic compounds of the metals of Group 2 and 13 of the Periodic Table. Most preferably the organometallic compounds are selected from magnesium and aluminum organometallics and especially from magnesium and aluminum alkyls or mixtures thereof represented by the formulas $R^1MgR^2$ and $R^1R^2AlR^3$ wherein each of $R^1$, $R^2$ and $R^3$ are the same or different alkyl groups, aryl groups, cycloalkyl groups, aralkyl groups, alkoxide groups alkadienyl groups or alkenyl groups. The hydrocarbon groups $R^1$, $R^2$ and $R^3$ preferably contain from 1 to 20 carbon atoms and more preferably from 1 to 10 carbon atoms.

In one embodiment, the organometallic compound is added in a suitable solvent to a slurry of the support material. Contact of the organometallic compound in a suitable solvent and the support is preferably maintained for about 30 to 180 minutes and preferably for 60 to 90 minutes at a temperature in the range of from 20° C. to 100° C. The diluent employed in slurrying the support can be any of the solvents employed in solubilizing the organometallic compound and is preferably the same.

The amount of surface modifying agent employed in preparation of the surface modified support material can vary over a wide range. Generally the amount will be in the range of from $1 \times 10^{-6}$ moles to about $2 \times 10^{-3}$ moles of modifying agent per gram of support material. However greater or lesser amounts can be employed.

Illustrative, but non-limiting examples of magnesium compounds which may be suitably employed as surface modifying agents include dialkyl magnesiums such as diethylmagnesium, dipropylmagnesiums, di-isopropylmagnesium, di-n-butylmagnesium, di-isobutylmagnesium, diamylmagnesium, di-n-octylmagnesium, di-n-hexylmagnesium, di-n-decylmagnesium, and di-n-dodecylmagnesium; dicycloalkylmagnesiums, such as dicyclohexylmagnesium; diarylmagnesiums such as dibenzylmagnesium, ditolylmagnesium, and dixylylmagnesium, alkylalkoxy magnesium such as ethyl magnesium ethoxide and the like.

Illustrative, but non-limiting examples of aluminum compounds which may be suitably employed surface modifying agents include trialkylaluminums such as trimethylaluminum, triethylaluminum, tripropylaluminum, triisobutylaluminum, tri-n-hexylaluminum, and tri-n-octylaluminum. Preferably, the organoaluminum compounds are trimethylaluminum, triisobutylaluminum, and triethylaluminum.

Preferably, the surface modifying agent is an organomagnesium compound of the formula $R^1MgR^2$ wherein each of $R^1$ and $R^2$ is a hydrocarbyl group having from one to six carbon atoms and most preferably $R^1$ and $R^2$ are different. Illustrative examples of preferred magnesium compounds include ethyl-n-propylmagnesium, ethyl-n-butylmagnesium, amyl-n-hexylmagnesium, n-butyl-sec-butylmagnesium, n-butyl-n-octylmagnesium and the like. Mixtures of hydrocarbylmagnesium compounds may be suitably employed such as, for example, di-n-butylmagnesium and ethyl-n-butylmagnesium.

Magnesium hydrocarbyl compounds are generally obtained from commercial sources as mixtures of the magnesium hydrocarbon compound with a minor amount of aluminum hydrocarbyl compound. A minor amount of aluminum hydrocarbyl is preferably present in order to facilitate solubilization and/or reduce the viscosity of the organomagnesium compound in hydrocarbon solvent. The hydrocarbon solvent usefully employed for the organomagnesium compound can be any of the well known hydrocarbon liquids, for example, hexane, heptane, octane, decane, dodecane, or mixtures thereof, as well as aromatic hydrocarbons such as benzene, toluene, xylene, etc.

A preferred organomagnesium complex with a minor amount of aluminum alkyl is represented by the formula $(R^1MgR^2)_x(R_3{}^4Al)_y$ wherein $R^1$ and $R^2$ are defined as above, $R^4$ is defined as $R^1$ and $R^2$ and x is greater than 0. The ratio of y to (y+x) is from 0 to less than 1, preferably from 0 to about 0.7 and most desirably from about 0 to 0.1. Illustrative examples of preferred organomagnesium-organoaluminum complexes are $[(n-C_4H_9)(C_2H_5)Mg][(C_2H_5)_3Al]_{0.02}$, $[(n-C_4H_9)_2Mg][(C_2H_5)_3Al]_{0.013}$, $[(n-C_4H_9)_2Mg][(C_2H_5)_3Al]_{2.0}$ and $[(n-C_6H_{13})_2Mg][(C_2H_5)_3Al]_{0.01}$.

Hydrocarbon soluble organomagnesium materials can be prepared by conventional methods. One such method involves, for example, the addition of an appropriate aluminum alkyl to a solid dialkylmagnesium in the presence of an inert hydrocarbon solvent. The organomagnesium-organoaluminum complexes are further described in the literature, for example in U.S. Pat. Nos. 3,737,393 and 4,004,071, the detailed descriptions of each being incorporated herein by reference. However, any other suitable method for preparation of organometallic compound may be employed.

The supported catalyst precursors may also pre-activated to influence the morphology, and in particular the bulk density, of polymer products produced. In one embodiment, the supported catalyst precursors are pre-activated with alumoxane and/or various bulky aluminum alkyls at an activator to transition metal, particularly titanium, molar ratio of from about 0.1 to about 15, more preferably about 0.1 to 10. Pre-activation can be achieved using a hydrocarbon slurry medium typically at temperatures from about 15° C. to 30° C. with continuous mixing followed by drying at temperatures between about 30° C. to 100° C., and preferably about 50° C. to 80° C., to obtain a free-flowing solid. Illustrative but non-limiting examples of pre-activating agents include diethyl aluminum chloride (DEAC), trihexyl aluminum (TnHAL), trioctyl aluminum (TNOA), methyl aluminoxane (MAO), and mixtures thereof.

Activation of the pre-activated catalyst precursor, prior to polymerization, can be accomplished by feeding a slurry of the pre-activated precursor into a suitable reactor under a nitrogen atmosphere, typically in an inert hydrocarbon diluent, such as hexane, heptane, isopentane, toluene, mineral oil or other hydrocarbons known to be useful in the field, followed by the addition of an alumoxane-based cocatalyst. The cocatalyst is preferably diluted with from about 2 to 40 weight percent of a hydrocarbon solvent similar to the one used to slurry the pre-activated catalyst, and is subsequently added to the reactor as a solution. Preferably, the total molar ratio of aluminum to transition metal, preferably titanium, in the system is from 5 to 300, preferably from about 100 to about 250, and more preferably from 50 to 150, depending on the specific embodiment. Illustrative but non-limiting examples of the cocatalyst systems employed in the present invention include, but are not limited to, physical mixtures of alumoxane including polymeric methyl aluminoxane (MAO), co-polymeric isobutyl methyl aluminoxane (Co-MAO), and mixtures of MAO or CoMAO along with conventional trialkyl aluminum compounds, such as triethyl aluminum (TEAL), tri-isobutyl aluminum (TIBA), trimethyl aluminum (TMA), trihexyl aluminum, diethyl aluminum chloride and mixtures thereof, said physical mixtures of alumoxane and trialkyl aluminum compounds comprising 10 to 90 mole percent alumoxane, and preferably 10 to 50 mole percent alumoxane, wherein the mole percent corresponds to the molar ratios of aluminum from each compound.

In-Reactor Produced Polymer Blend

The heterogeneous polymer blend produced by the present process comprises particles of the second elastomeric polymer, normally an ethylene/propylene copolymer, dispersed within a matrix of the first thermoplastic polymer, normally a propylene polymer, in which the particles of the second polymer are evenly distributed and have a broad particle size distribution. Typically, the elastomeric copolymer includes ethylene units in the range from 12 wt % to 88 wt % of the copolymer and propylene or other α-olefin(s) units in the range from 88 wt % to 12 wt %, desirably ethylene units in the range from 30 to 70 wt % and propylene or other α-olefin(s) units in the range from 70 to 30 wt %; more desirably ethylene units in the range from 40 wt % to 60 wt % and propylene or other α-olefin(s) units in the range from 60 to 40 wt % of the copolymer.

Additives

The heterogeneous polymer blend according to the invention may optionally contain reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the rubber compounding art. Such additives may comprise up to about 70 weight percent, more preferably up to about 65 weight percent, of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the heterogeneous polymer blend during the polymerization in either the first polymerization zone or the second polymerization zone. The additives can be added into the effluent from the second polymerization zone and are preferably added into the polymer blend after removal of solvent or diluent through melt blending.

Additional polymers can also be added to form blends. In one or more embodiments, the additional polymers include thermoplastic resins. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the homopolypropylene, impact, and random copolymers of propylene with ethylene or the higher α-olefins, described above, or with $C_{10}$-$C_{20}$ diolefins. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1 to about 30% by weight of the polymer, for example, See U.S. Pat. Nos. 6,268,438, 6,288,171, and 6,245,856. Copolymers available under the tradename VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Uses of the Polymer Blends

The heterogeneous polymer blends described herein may be shaped into desirable end use articles by any suitable means known in the art. They are particularly useful for making articles by blow molding, extrusion, injection molding, thermoforming, gas foaming, elasto-welding and compression molding techniques.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 200° C. and 300° C., such as between 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 cm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 λm in one embodiment, from 200 λm to 6000 µm in another embodiment, and from 250 µm to 3000 λm in yet another embodiment, and from 500 λm to 1550 λm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, Compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

The thermoplastic elastomer blends of this invention are useful for making a variety of articles such as weather seals, hoses, belts, gaskets, moldings, boots, elastic fibers and like articles. Foamed end-use articles are also envisioned. More specifically, the blends of the invention are particularly useful for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

The invention will now be more particularly described with reference to the Examples and the accompanying drawing.

In the examples, peak melting point (Tm) and peak crystallization temperature (Tc) were determined using the following procedure according to ASTM E 794-85. Crystallinity was calculated using heat of fusion determined using ASTM D 3417-99. Differential scanning calorimetric (DSC) data were obtained using a TA Instruments model Q100 machine or a Perkin-Elmer DSC-7. Samples weighing approximately 5-10 mg were sealed in aluminum sample pans. The DSC data were recorded by first cooling the sample to −100° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity. The percent crystallinity is calculated using the formula, [area under the curve (Joules/gram)/B (Joules/gram)]*100, where B is the heat of fusion for the homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. A value of 290 J/g is used for the heat of fusion for 100% crystalline polyethylene. The melting and crystallization temperatures reported here were obtained during the second heating/cooling cycle. For polymers displaying multiple cooling and melting peaks, all the peak crystallization temperatures and peaks melting temperatures were reported. The heat of fusion for each melting peak was calculated individually. Typically, a polymer blend produced in the present process involving a Ziegler-Natta catalyst will show a secondary cooling peak overlapping with the principal peak, which peaks are considered together as a single cooling point. The highest of these peaks is considered the crystallization point.

The glass transition temperature (Tg) was measured by ASTM E 1356 using a TA Instruments model Q100 machine.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

AFM phase images of all specimens were converted into a TIFF format and processed using PHOTOSHOP (Adobe Systems, Inc.). The image processing tool kit (Reindeer Games, Inc.) was applied for image measurements. Results of image measurements were written into a text file for subsequent data processing using EXCEL (Microsoft) or MATLAB (MathWorks, Inc.) for computing sizes/shapes of dispersed phases, co-continuity factor of co-continuous phases, or nearest-neighbor inter-particle distances.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the area under propylene band at ~1165 $cm^{-1}$ and the area of ethylene band at ~732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. The ethylene content in wt. % was calculated according to the following equation:

$$\text{ethylene content (wt. \%)} = 72.698 - 86.495X + 13.696X^2$$

where $X=AR/(AR+1)$ and AR is the ratio of the area for the peak at ~1165 $cm^{-1}$ to the area of the peak at ~732 $cm^{-1}$.

Solvent extraction was used to isolate the different polymer species of the in-reactor polymer blends. Various types of solvent were used depending on the crystallinity of elastomeric component. For low crystallinity elastomer, cyclohexane was used. In the cyclohexane solvent extraction, about 0.3 gram of polymer was placed in about 60 ml of cyclohexane to isolate the elastomeric components of the polymer blend. The mixture was continuously stirred at room temperature for about 48 hours. The soluble fraction (referred as cyclohexane solubles) was separated from the insoluble material (referred as cyclohexane insolubles) using filtration under vacuum. The insoluble material is where the thermoplastic crystalline component resides.

Shore hardness was determined according to ISO 868.

Stress-strain properties such as ultimate tensile strength, ultimate elongation, and 100% modulus were measured on 2 mm thick compression molded plaques at 23° C. by using an Instron testing machine according to ISO 37.

Compression set test was measured according to ISO 815A.

Tension set was measured according to ISO 2285.

Oil swell (oil gain) was determined after soaking a die-cut sample from compression molded plaque in IRM No. 3 fluid for 24 hours at 125° C. according to ASTM D 471.

LCR (Laboratory Capillary Rheometer) viscosity was measured according to ASTM D 3835-02 using a Dynisco Capillary rheometer at 30:1 L/D (length/diameter) ratio, a shear rate of 1200 l/s and a temperature of 204° C. The entrance angle of the laboratory capillary rheometer is 180°, barrel diameter is 9.55 mm. The heat soak time is 6 minutes.

EXAMPLES 1-1 TO 1-5

Five polymer blends were produced in a two-stage polymerization reaction by polymerizing propylene in a slurry process in the first stage to make homopolymer, and copolymerizing propylene and ethylene in a solution process in a second stage in the presence of the homopolymer produced in the first stage. These examples were used to simulate a continuous two-stage polymerization with two reactors in series configuration. The polymerization was carried out in an autoclave reactor equipped with a stirrer, an external water/steam jacket for temperature control, a regulated supply of dry nitrogen, ethylene, propylene, and a septum inlet for introduction of other solvents, catalysts and scavenger solutions. The reactor was first washed using hot toluene and then dried and degassed thoroughly prior to use. All the solvents and monomers were purified by passing through a 1-liter basic alumina column activated at 600° C., followed by a column of molecular sieves activated at 600° C. or Selexsorb CD column prior to transferring into the reactor.

In the first stage of polymerization, a scavenger solution, $H_2$ and propylene were first added to the reactor. All of these were conducted at room temperature. The mixture was then stirred and heated to a desired polymerization temperature. Then a supported metallocene catalyst was injected into the reactor with additional propylene to start polymerization. The first stage of polymerization was ended when the desired amount of polypropylene was produced, determined by monitoring the reactor pressure during the reaction. In the second stage of polymerization, the content from the first stage was kept in the reactor. Solvent was first added to the reactor for the second stage of polymerization. The reaction medium was then heated to a desired temperature. The reactor was then pressurized to about 400 psig (4060 kPa) with ethylene. Then the preactivated second catalyst solution was injected into the reactor. Thereafter, the reactor was controlled at a desired pressure by adjusting the ethylene feed pressure. The ethylene was fed on demand to maintain a relatively constant reactor pressure during the second polymerization reaction. The ethylene feed pressure reported in Tables 1 and 2 was the pressure difference in the reactor at the end of the first stage and the ethylene feed line pressure during the second stage. The second stage of the polymerization reaction was terminated when the desired amount of polymer was produced. Thereafter, the reactor was cooled down and unreacted monomer and solvent (diluent) were vented to the atmosphere. The resulting mixture, containing mostly solvent, polymer and unreacted monomers, was collected in a collection box and first air-dried in a hood to evaporate most of the solvent, and then dried in a vacuum oven at a temperature of about 90° C. for about 12 hours.

Both triethyl aluminum (TEAL) (1 mol. % in hexane) and tri-n-octyle aluminum (TNOA) (25 wt % in hexane) were obtained from Sigma Aldrich.

The supported catalyst system used in the first stage was a metallocene catalyst on a fluorided ("F") silica support, and a non-coordinating anion ("NCA") activator, such as described in U.S. Pat. No. 6,143,686. The catalyst system was prepared as described in U.S. Pat. No. 6,143,686 by combining trisperfluorophenylboron in toluene (Albemarle Corporation, Baton Rouge, La.) with N,N-diethyl aniline and then mixing the combination with fluorided silica. Rac-dimethylsilanyl-bis(2-methyl-4-phenylindenyl)zirconium dimethyl was then added.

The fluorided silica is described in International Patent Publication No. WO 00/12565. Generally, to prepare the fluorided silica, $SiO_2$ supplied by Grace Davison, a subsidiary of W. R. Grace Co., Conn., as Sylopol® 952 ("952 silica gel") having a $N_2$ pore volume of 1.63 cc/gm and a surface area of 312 $m^2$/gM, was dry mixed with 0.5 to 3 grams of ammonium hexafluorosilicate supplied by Aldrich Chemical Company, Milwaukee, Wis. The amount of ammonium hexafluorosilicate added corresponded to 1.05 millimole F per gram of silica gel. The mixture was transferred to a furnace and a stream of $N_2$ was passed up through the grid to fluidize the silica bed. The furnace was heated according to the following schedule:

Raise the temperature from 25 to 150° C. over 5 hours;
Hold the temperature at 150° C. for 4 hours;
Raise the temperature from 150 to 500° C. over 2 hours;
Hold the temperature at 500° C. for 4 hours;
Turn heat off and allow to cool under $N_2$;
When cool, the fluorided silica was stored under $N_2$.

The catalyst system was suspended in oil slurry for ease of addition to the reactor. Drakeol™ mineral oil (Penreco, Dickinson, Tex.) was used.

The second catalyst was [di(p-triethylsilylphenyl) methylene] (cyclopentadienyl) (3,8-di-t-butylfluorenyl)hafnium dimethyl and was preactivated with dimethyl anilinium tetrakis(heptafluoro-2-naphthyl) borate at a catalyst/activator molar ratio of about 1:1 in toluene to form a stock solution. The second catalyst used in Example 1-5 was preactivated with N,N-dimethylanilinium tetrakis(pentafluorophenyl) borate in toluene.

The polymerization reaction was carried out in a 2-liter reactor. Details of the experimental conditions and the properties of the resultant polymer blends are listed in Table 1 below.

TABLE 1

| Example # | 1-1 | 1-2 | 1-3 | 1-4 | 1-5 |
|---|---|---|---|---|---|
| First stage of polymerization | | | | | |
| Polymerization temperature (° C.) | 70 | 70 | 70 | 70 | 50 |
| Amount of the first catalyst (mg) | 49.8 | 54.4 | 42.5 | 44.4 | 200 |
| Propylene in the first stage (ml) | 600 | 500 | 500 | 500 | 800 |

TABLE 1-continued

| Example # | 1-1 | 1-2 | 1-3 | 1-4 | 1-5 |
|---|---|---|---|---|---|
| H2 in the first stage (mmol) | 4.2 | 4.2 | 4.2 | 4.2 | 12.5 |
| Scavenger | TNOA | TNOA | TNOA | TNOA | TEAL |
| Scavenger amount (ml) | 3 | 2 | 2 | 2 | 2 |
| Reaction time for the first stage (min) | 120 | 20 | 60 | 30 | 120 |
| Second stage of polymerization | | | | | |
| Polymerization temperature (° C.) | 90 | 90 | 90 | 90 | 55 |
| Amount of the second catalyst (mg) | 0.8 | 0.6 | 0.3 | 0.6 | 2 |
| Ethylene fed pressure in the second stage (psi) | 195 | 210 | 210 | 210 | 180 |
| Solvent used in 2nd stage | toluene | hexane | hexane | hexane | hexane |
| Amount of solvent (ml) | 800 | 600 | 600 | 600 | 400 |
| Reaction time for the second stage (min) | 10 | 5 | 5 | 5 | 15 |
| Yield (g) | 166 | 175 | 145 | 210 | 387 |
| Tc in a primary peak (° C.) | 105.2 | 48.3 | 106.8 | 111.4 | 108.9 |
| Tm in a primary peak (° C.) | 153.6 | 154.8 | 153.9 | 154.4 | 151.5 |
| Heat of fusion in a primary peak (J/g) | 47.8 | 6.0 | 16.5 | 16.2 | 29.5 |
| Heat of crystallization in a primary peak (J/g) | 51.7 | 8.1 | 16.2 | 10.1 | |
| Tg (° C.) | −34.2 | −47.4 | −50.0 | −46.7 | −46.4 |
| Tc in a secondary peak (° C.) | | | | 45.0 | |
| Cyclohexane soluble (%) | | | | | 67.3 |
| Cyclohexane insoluble (%) | | | | | 32.7 |

An ultra soft polymer blend with high melting temperature was produced in Example 1-2.

The polymer blend in Example 1-5 was subject to solvent extraction using cyclohexane. 32.7 wt % of cyclohexane insoluble was obtained. This sample had a shore A hardness of 35.

EXAMPLE 2-1 TO 2-3

Examples 2-1 through 2-3 demonstrate a two-stage polymerization reaction with the use of a supported Ziegler-Natta catalyst to produce polypropylene in a slurry process and a homogeneous metallocene catalyst to produce ethylene/propylene rubber in a solution process. The polymerization was carried out by the following the same procedure as described in Example 1-1 to 1-5 except that a Ziegler-Natta catalyst was employed. The catalyst was comprised of TiCl$_4$ supported on MgCl$_2$. The polymerization procedure was as follows: 2 ml of triethyl aluminum solution (TEAL) (1 mol % in hexane), 20.9 mmole of H2 and 300 ml of propylene were first added into a 2-liter autoclave reactor. The mixture was then immediately stirred and heated rapidly to a desired polymerization temperature. Then a specific amount of Zieglar-Natta catalyst along with 2 ml of cyclohexylmethyl dimethoxysilane solution (CMMS) (0.1 mol % in hexane) was flushed into the reactor with additional propylene. The first stage of polymerization proceeded at the introduction of the catalyst. At the end of the first stage of polymerization, all of the reactor content was kept in the reactor. At the beginning of the second stage, the solvent (such as toluene or hexane) was added into the reactor, followed by the introduction of ethylene and the preactivated second catalyst solution. Thereafter, the reactor was heated to a desired temperature and controlled at a desired pressure by adjusting the ethylene feed pressure. The ethylene was fed on demand to maintain a relatively constant reactor pressure during the second polymerization reaction. The second catalyst was [di(p-triethylsilylphenyl) methylene] (cyclopentadienyl) (3,8-di-t-butylfluorenyl)hafnium dimethyl and was preactivated with dimethyl anilinium tetrakis(heptafluoro-2-naphthyl) borate at a catalyst/activator molar ratio of about 1:1 in toluene to form a stock solution. The detailed polymerization conditions as well as some analytical data for these samples are listed in Table 2.

TABLE 2

| Example # | 2-1 | 2-2 | 2-3 |
|---|---|---|---|
| First stage of polymerization | | | |
| Polymerization temperature (° C.) | 70 | 70 | 70 |
| Amount of the first catalyst (mg) | 21 | 10.5 | 10.8 |
| Propylene in the first stage (ml) | 500 | 500 | 500 |
| H2 in the first stage (mmol) | 20.9 | 20.9 | 20.9 |
| TEAL (ml) (1 mol % in hexane) | 2 | 2 | 2 |
| Reaction time for the first stage (min) | 60 | 60 | 60 |
| Second stage of polymerization | | | |
| Polymerization temperature (° C.) | 80 | 80 | 80 |
| Amount of the second catalyst (mg) | 4 | 4 | 4 |
| Ethylene fed pressure in the second stage (psi) | 230 | 230 | 230 |
| Toluene (ml) | 500 | 510 | 500 |
| Reaction time for the second stage (min) | 8 | 10 | 10 |
| Yield (g) | 334 | 190 | 234 |
| Tc in a primary peak (° C.) | 112.3 | 105.5 | 103.4 |
| Tm in a primary peak (° C.) | 168.1 | 168.3 | 162.7 |
| Heat of fusion in a primary peak (J/g) | 54.0 | 46.0 | 38.5 |
| Heat of crystallization in a primary peak (J/g) | 84.5 | 70.7 | 59.7 |
| Tm in a secondary peak (° C.) | 123.1 | 123.0 | 117.2 |
| Heat of fusion in a secondary peak (J/g) | 22.4 | 15.7 | 10.6 |

Figure 1:
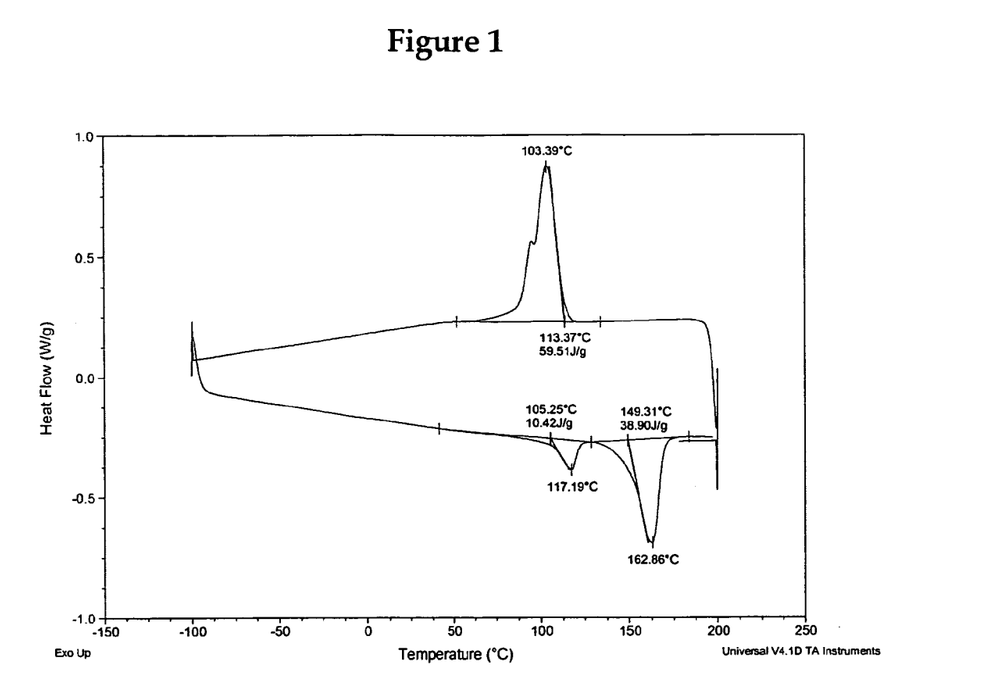
FIG. 1 is a differential scanning calorimetry (DSC) trace for the polymer produced in Example 2-3.

All of the polymers produced in Examples 2-1 to 2-3 show dual melting peaks and a broad overlapping cooling peak in the second heating/cooling cycle on the DSC traces. It is believed that the presence of the second peak is due to the polymer derived from the Ziegler-Natta catalyst in the second stage of polymerization. The DSC trace of the second heating/cooling cycle for Example 2-3 is shown in FIG. 1.

In a further embodiment, the invention relates to:

1. A process for producing a polymer blend comprising a thermoplastic first polymer having a crystallinity of at least 30% and a second polymer having a crystallinity of less than 20%, the process comprising:

(a) polymerizing at least one first monomer in a first slurry phase reaction zone in the presence of a supported first catalyst under conditions to produce said thermoplastic first polymer; and (b) contacting at least part of said first polymer with at least one second monomer different from said first monomer in a second solution phase reaction zone in the presence of a second catalyst and in the absence of polyenes under conditions to produce said second polymer.

2. The process of paragraph 1 wherein the first catalyst comprises a metallocene catalyst.

3. The process of paragraph 1 or 2 wherein the first catalyst comprises a Ziegler-Natta catalyst.

4. The process of any of paragraphs 1 to 3 wherein the second catalyst comprises a metallocene catalyst.

5. The process of any of paragraphs 1 to 4 wherein said thermoplastic first polymer is a homopolymer of propylene or a copolymer of propylene with less than 10 wt % of at least one comonomer.

6. The process of any of paragraph 5 wherein said at least one comonomer comprises ethylene or a $C_4$ to $C_{12}$ olefin.

7. The process of any of paragraphs 1 to 6 wherein said second monomer comprises ethylene.

8. The process of any of paragraphs 1 to 7 wherein said polymer blend comprises a heterogeneous blend in which said first polymer comprises a continuous phase of the blend and said second polymer is in the form of particles dispersed in said continuous phase.

9. The process of any of paragraphs 1 to 8 wherein said polymer blend comprises a homogeneous blend.

10. A process for producing a polymer blend comprising a first phase comprising a thermoplastic first polymer comprising units derived from propylene and a second elastomeric phase comprising a second polymer comprising units derived from ethylene and propylene, the process comprising:
(a) polymerizing at least one first monomer comprising propylene in a first slurry phase reaction zone in the presence of a supported first catalyst under conditions to produce said thermoplastic first polymer; and
(b) contacting at least part of said first polymer with at least one second monomer comprising ethylene in a second solution phase reaction zone in the presence of a second catalyst and in the absence of polyenes under conditions to produce said second polymer.

11. The process of paragraph 10 wherein the first catalyst comprises a metallocene catalyst.

12. The process of paragraph 10 or 11 wherein the first catalyst comprises a Ziegler-Natta catalyst.

13. The process of any of paragraphs 10 to 12 wherein the second catalyst comprises a metallocene catalyst.

14. The process of any of paragraphs 10 to 13 wherein said thermoplastic first polymer is a homopolymer of propylene or a copolymer of propylene with less than 10 wt % of at least one comonomer.

15. The process of any of paragraphs 10 to 14 wherein at least one comonomer comprises ethylene or a $C_4$ to $C_{12}$ olefin.

16. The process of any of paragraphs 10 to 15 wherein said second polymer is a copolymer of propylene with from about 8 wt % to about 70 wt % of said at least one second monomer comprising ethylene.

17. The process of any of paragraphs 10 to 16 wherein said polymer blend comprises a heterogeneous blend in which said first polymer comprises a continuous phase of the blend and said second polymer is in the form of particles dispersed in said continuous phase.

18. A process for producing a polymer blend comprising a first phase comprising a thermoplastic first polymer comprising units derived from propylene and a second elastomeric phase comprising a second polymer comprising units derived from ethylene and propylene, the process comprising:
(a) polymerizing at least one first monomer comprising propylene in a first slurry phase reaction zone in the presence of a supported Ziegler-Natta catalyst under conditions to produce said thermoplastic first polymer; and
(b) contacting at least part of said first polymer with at least one second monomer comprising ethylene in a second solution phase reaction zone in the presence of a metallocene catalyst under conditions to produce said second polymer.

19. The process of paragraph 18 wherein said thermoplastic first polymer is a homopolymer of propylene or a copolymer of propylene with less than 10 wt % of at least one comonomer.

20. The process of paragraph 19 wherein said at least one comonomer comprises ethylene or a $C_4$ to $C_{12}$ olefin.

21. The process of any of paragraphs 18 to 21 wherein said second polymer is a copolymer of propylene with from about 8 wt % to about 70 wt % of said at least one second monomer comprising ethylene.

22. The process of any of paragraphs 18 to 21 wherein said polymer blend comprises a heterogeneous blend in which said first polymer comprises a continuous phase of the blend and said second polymer is in the form of particles dispersed in said continuous phase.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. Furthermore, all patents, test procedures, and other documents, including priority documents, cited in this application are fully incorporated by reference to the extent such disclosure is not inconsistent with this application and for all jurisdictions in which such incorporation is permitted.

What is claimed is:

1. A process for producing a polymer blend comprising a thermoplastic first polymer having a crystallinity of at least 30% and a second polymer having a crystallinity of less than 20%, the process comprising:
(a) polymerizing at least one first monomer in a first slurry phase reaction zone in the presence of a supported first catalyst under conditions to produce said thermoplastic first polymer; and
(b) contacting at least part of said first polymer with at least one second monomer different from said first monomer in a second solution phase reaction zone in the presence of a second catalyst and in the absence of polyenes under conditions to produce said second polymer.

2. The process of claim 1, wherein the first catalyst comprises a metallocene catalyst.

3. The process of claim 1, wherein the first catalyst comprises a Ziegler-Natta catalyst.

4. The process of claim 1, wherein the second catalyst comprises a metallocene catalyst.

5. The process of claim 1, wherein said thermoplastic first polymer is a homopolymer of propylene or a copolymer of propylene with less than 10 wt % of at least one comonomer.

6. The process of claim 5, wherein said at least one comonomer comprises ethylene or a $C_4$ to $C_{12}$ olefin.

7. The process of claim 1, wherein said second monomer comprises ethylene.

8. The process of claim 1, wherein said polymer blend comprises a heterogeneous blend in which said first polymer comprises a continuous phase of the blend and said second polymer is in the form of particles dispersed in said continuous phase.

9. The process of claim 1, wherein said polymer blend comprises a homogeneous blend.

10. A process for producing a polymer blend comprising a first phase comprising a thermoplastic first polymer comprising units derived from propylene and a second elastomeric phase comprising a second polymer comprising units derived from ethylene and propylene, the process comprising:
   (a) polymerizing at least one first monomer comprising propylene in a first slurry phase reaction zone in the presence of a supported first catalyst under conditions to produce said thermoplastic first polymer; and
   (b) contacting at least part of said first polymer with at least one second monomer comprising ethylene in a second solution phase reaction zone in the presence of a second catalyst and in the absence of polyenes under conditions to produce said second polymer.

11. The process of claim 10, wherein the first catalyst comprises a metallocene catalyst.

12. The process of claim 10, wherein the first catalyst comprises a Ziegler-Natta catalyst.

13. The process of claim 10, wherein the second catalyst comprises a metallocene catalyst.

14. The process of claim 10, wherein said thermoplastic first polymer is a homopolymer of propylene or a copolymer of propylene with less than 10 wt % of at least one comonomer.

15. The process of claim 14, wherein said at least one comonomer comprises ethylene or a $C_4$ to $C_{12}$ olefin.

16. The process of claim 10, wherein said second polymer is a copolymer of propylene with from about 8 wt % to about 70 wt % of said at least one second monomer comprising ethylene.

17. The process of claim 10, wherein said polymer blend comprises a heterogeneous blend in which said first polymer comprises a continuous phase of the blend and said second polymer is in the form of particles dispersed in said continuous phase.

18. A process for producing a polymer blend comprising a first phase comprising a thermoplastic first polymer comprising units derived from propylene and a second elastomeric phase comprising a second polymer comprising units derived from ethylene and propylene, the process comprising:
   (a) polymerizing at least one first monomer comprising propylene in a first slurry phase reaction zone in the presence of a supported Ziegler-Natta catalyst under conditions to produce said thermoplastic first polymer; and
   (b) contacting at least part of said first polymer with at least one second monomer comprising ethylene in a second solution phase reaction zone in the presence of a metallocene catalyst under conditions to produce said second polymer.

19. The process of claim 18, wherein said thermoplastic first polymer is a homopolymer of propylene or a copolymer of propylene with less than 10 wt % of at least one comonomer.

20. The process of claim 19, wherein said at least one comonomer comprises ethylene or a $C_4$ to $C_{12}$ olefin.

21. The process of claim 18, wherein said second polymer is a copolymer of propylene with from about 8 wt % to about 70 wt % of said at least one second monomer comprising ethylene.

22. The process of claim 18, wherein said polymer blend comprises a heterogeneous blend in which said first polymer comprises a continuous phase of the blend and said second polymer is in the form of particles dispersed in said continuous phase.

* * * * *